Dec. 19, 1972 R. AZZOLA 3,706,628
EXTRUDED FLEXIBLE SEALING STRIP
Filed Dec. 29, 1970 3 Sheets-Sheet 1

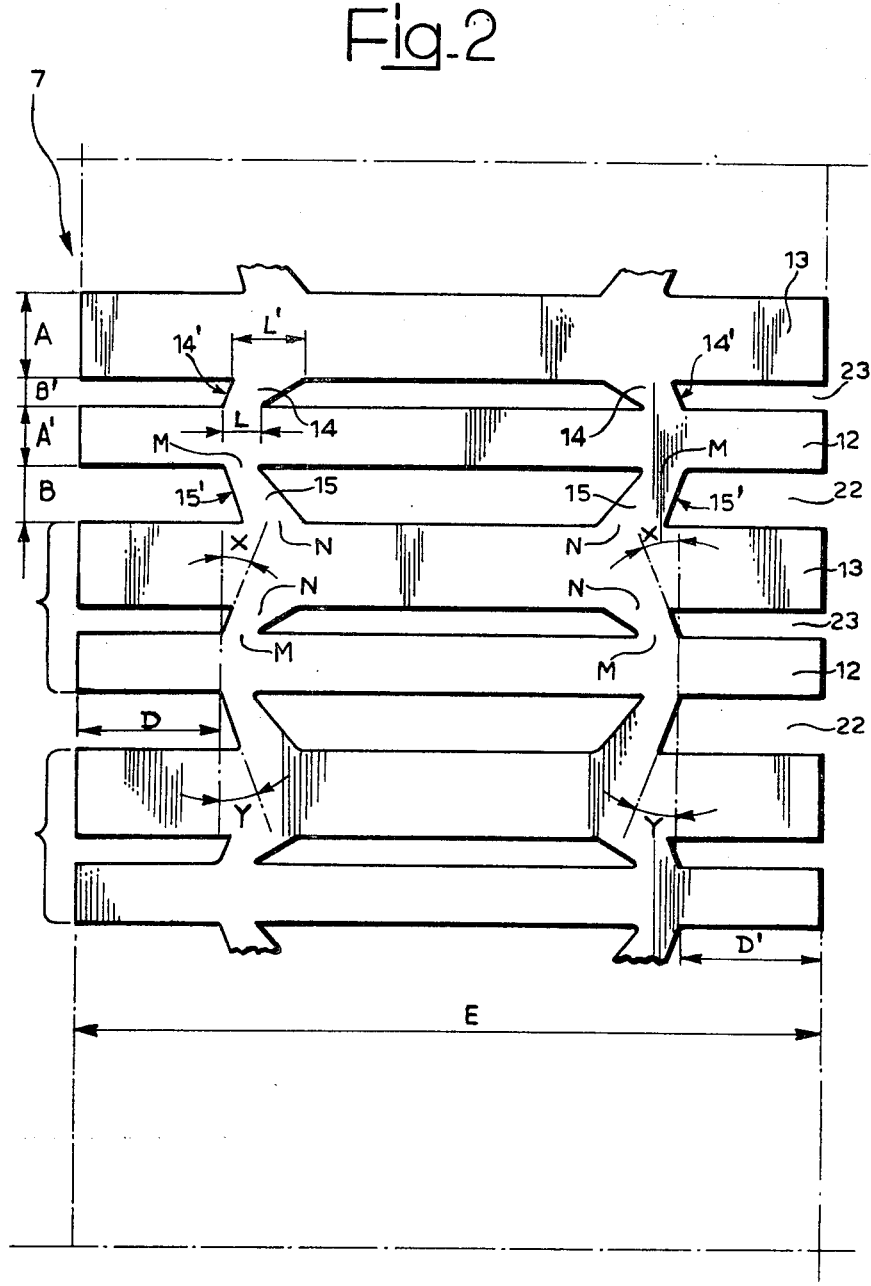

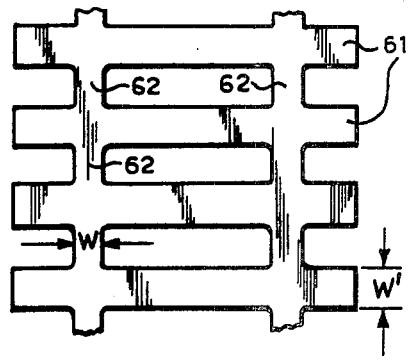
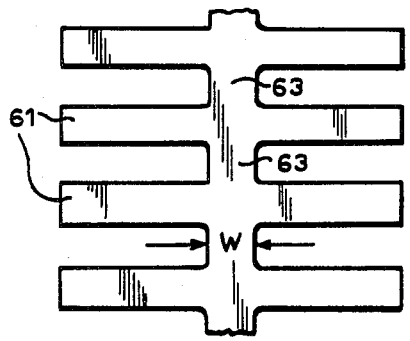
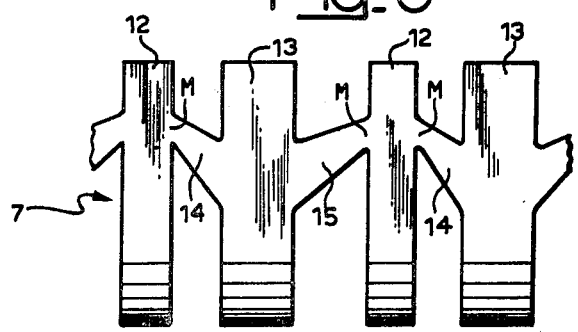
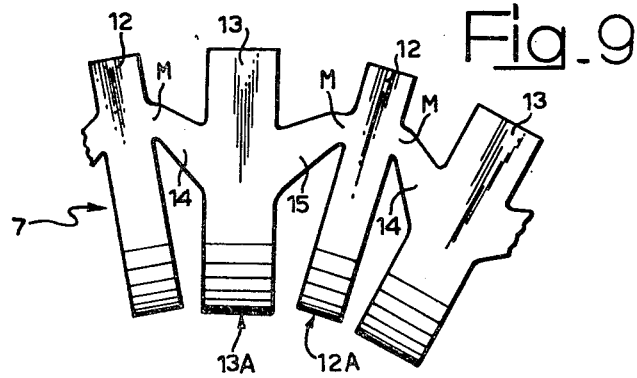

United States Patent Office 3,706,628
Patented Dec. 19, 1972

3,706,628
EXTRUDED FLEXIBLE SEALING STRIP
Roberto Azzola, Turin, Italy, assignor to Saiag S.p.A. Industria Articoli Gomma, Cirie, Turin, Italy
Filed Dec. 29, 1970, Ser. No. 102,314
Claims priority, application Italy, Jan. 14, 1970, 67,092/70; Nov. 26, 1970, 70,958/70
Int. Cl. B32b 3/26, 5/18
U.S. Cl. 161—159
15 Claims

ABSTRACT OF THE DISCLOSURE

A flexible sealing strip comprising extrusion-bonded sealing and anchoring sections of cellular rubber and solid rubber, respectively, includes a reinforcing strip of stamped sheet metal embedded in the anchoring section; the reinforcing strip consists of a series of transversely extending, alternately wide and narrow bars forming therebetween alternately wide and narrow gaps, the bars being interconnected by pairs of oppositely obliquely directed bridging pieces the roots of which on the wide bars are closer to the longitudinal axis of the reinforcing strip than the roots on the narrow bars.

---

This invention relates to extruded flexible sealing strips, particularly suitable for use in connection with vehicle doors and engine and luggage compartments in motor cars, said sealing strips comprising a sealing section (typically of a tubular profile) co-extensive longitudinally of the strip with an anchoring section of a profile suitable for engagement with a strip-supporting part such as an upturned edge, a channel member or the like.

A highly advantageous type of extruded flexible sealing strips comprises a sealing section of a cellular polymeric material extrusion-bonded to an anchoring section of solid (i.e. non-cellular) polymeric material. The polymeric material may consist of a synthetic thermoplastic resin (e.g. plasticized polyvinyl chloride) or of a natural or synthetic rubber as recently proposed and commercially exploited by applicant. The advantage of such flexible sealing strips resides not only in an improved sealing effect due to the softness of the sealing section made of cellular polymeric material, but also in an improved adaptability of the sealing strip to curvilinear configurations of its supporting edge or channel as compared with a sealing strip entirely made of solid polymeric material. Nevertheless, the said adaptability is still opposed by the "springiness" of the anchoring section, which latter must necessarily be made from a rather springy plastics or rubber for the purpose of a firm engagement with the edge or channel on which the sealing strip is to be mounted. According to a "prima facie" impression, this problem could easily be solved by making the anchoring section of solid rubber of a relatively soft character and embedding in said section a reinforcing strip of stamped sheet metal (similarly to certain types of sealing strips not concerned with this invention). However, a deeper insight into the problem shows that there are several component problems to be solved simultaneously and that a number of said component problems are in conflict with each other.

In order to clearly explain both the said problems and the features of this invention, reference is made at this point to the accompanying drawings, wherein:

FIG. 2 is a plan view of an embodiment of a reinforcing sheet-metal strip used in the sealing strips shown in FIGS. 1, 3, 4 and 5, the reinforcing strip being shown in FIG. 3 in its planar (flattened out) condition;

FIGS. 6 and 7 show, in a similarly planar condition, two reinforcing strips most frequently used in the prior art;

FIG. 8 is a lateral part-view showing the reinforcing strip of FIG. 2 in its channel-shaped configuration corresponding to that shown in FIG. 4;

FIG. 9 is a view similar to that of FIG. 8 showing the reinforcing strip in its configuration taken when the sealing strip of FIG. 4 is mounted on a curved edge of its supporting member.

Figure 1:
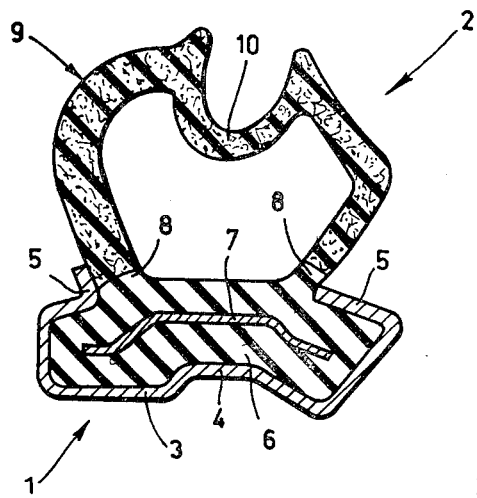
FIGS. 1, 3, 4 and 5 are cross-sectional views of four embodiments of a flexible sealing strip according to this invention.

In FIGS. 1 through 5, corresponding parts are indicated by similar reference numerals.

In FIG. 1, reference 1 indicates a channel member of pressed sheet metal making part of a door frame in a motor car. The bottom wall 3 of the member 1 is centrally formed with a ridge 4 of a trapezoidal cross-sectional profile, while the side walls of the member 1 terminate each by a flange 5 for retaining in the member 1 a flexible sealing strip generally denoted by 2. The sealing strip 2 comprises an anchoring section 6 of solid rubber, of a profile matching the inner profile of the channel member 1, and a sealing section 9 of cellular rubber extrusion-bonded to the anchoring section 6. More particularly, the latter section includes a pair of ribs 8 adjacent the flanges 5, while the sealing section 9 is of an inverted channel shape, the longitudinal edges of which are extrusion-bonded to their corresponding ribs 8. The sealing section 9 is recessed at 10 for a sealing engagement with its abutting counterpart (not shown) of the car body. The anchoring section 6 has embedded therein a reinforcing strip 7 stamped of sheet metal which stiffens the section 6 to prevent accidental disengagement of the sealing strip from the channel member 1. It will be seen that the reinforcing strip 7 has a cross-sectional shape roughly matching the bottom wall 3 of the channel member 1.

Figure 3:
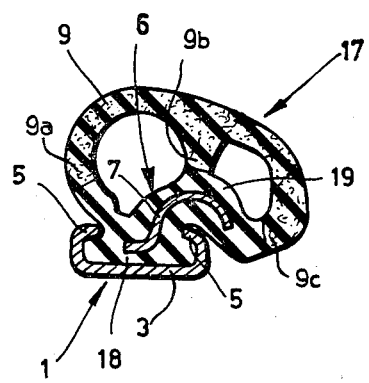

In FIG. 3, the bottom wall 3 of the channel member 1 is planar. The sealing strip 17 still comprises an anchoring section 6 of solid rubber having extrusion-bonded thereto a sealing section 9 of cellular rubber. The sealing section 9 presents, in cross-sectional view shown, three branches 9a, 9b, 9c bonded to their corresponding ribs on the anchoring section 6, the latter comprising a foot 18 received by the channel member 1 and an arcuate web portion 19 overriding one of the flanges 5. The reinforcing strip 7 has the arcuate cross-sectional profile shown in the figure.

Figure 4:
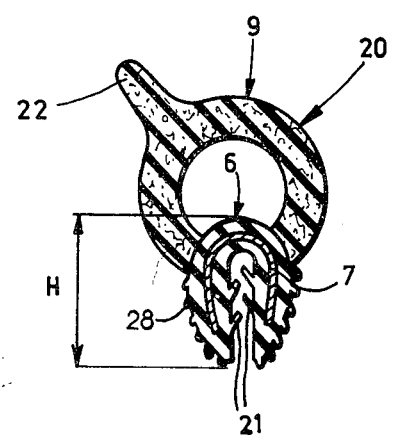

In the embodiment shown in FIG. 4, the sealing strip 20 comprises an anchoring section 6 of channel shape internally formed with serrations 21 for a gripping engagement on an edge of a supporting part (not shown). The reinforcing strip 7 is correspondingly bent to a U-shape to stiffen the branches of the anchoring section. The sealing section 9 is of a ¾ circular profile and includes an inclined radial rib 22 for sealing engagement of the strip 20 with its abutting counterpart (not shown). An ornamental pattern 28 is usually embossed on the exposed surface of the anchoring section 6.

Figure 5:
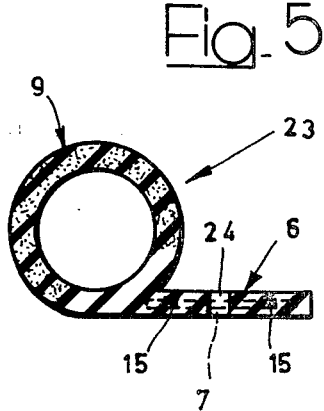

FIG. 5 shows a sealing strip 23 of a circular hollow profile with an integral tangential flap. About ¾ circumference of said circular hollow profile are formed of cellular rubber to provide the sealing section 9. The remaining ¼ circumference and the tangential flap are formed of solid rubber to provide the anchoring section 6, the flap having embedded therein a reinforcing strip 7 and being formed with a longitudinal series of apertures 24 for fastening the sealing strip 23 to its supporting structure (not shown).

In each of the embodiments described above the anchoring section 6 is extruded around the reinforcing strip 7 axially fed through the extrusion aperture for said section, while at the same time the sealing section 9 is extruded on the anchoring section in bonding contact with the latter, the extrudate being vulcanized and wound up on a take-up reel, all in a continuous manufacturing process.

The problems underlying this invention may be now outlined as follows:

(a) The sealing strip as depicted hereinbefore must be highly flexible, in order to not oppose undesirable rigidity on mounting on variously curved edges or channels, and its flexibility must not be appreciably impaired by the presence of the reinforcing strip.

(b) The sealing strip must be able to faithfully follow unusually narrow bends (i.e. curves of unusually small radius of curvature), thereby to not pose relevant problems in the design of the motor car body.

(c) The sealing strip must accept its curved configuration without forming wrinkles arising from the presence of the reinforcing strip. This implies that the reinforcing strip itself must not wrinkle on bending of the sealing strip.

(d) The reinforcing strip must not add "springiness" to the sealing strip. In other words, the reinforcing strip must readily take a "permanent set" as the sealing strip is being mounted on a curved supporting edge, in order to avoid the tendency of the sealing strip to disengage from its supporting member both during assembly and in use.

(e) The reinforcing strip must be formed with gaps or slits wide enough to permit the rubbery mass being extruded to satisfactorily fill said gaps or slits thereby to firmly entrap the reinforcing strip in the anchoring section.

(f) At the same time the reinforcing strip must be substantially indeformable in the extrusion conditions of the anchoring section, and (g) A sufficiently continuous support must be offered by the reinforcing strip to the material of the anchoring section during embossing of the latter, in order to obtain a uniform and regular ornamental pattern.

FIGS. 6 and 7 show the most frequently used reinforcing strips stamped of sheet metal. Each of these strips comprises a plurality of uniformly spaced transverse bars 61. In FIG. 6, the bars are interconnected by bridge pieces 62, formed integrally with the bars and disposed in two transversely spaced longitudinal rows spaced from the ends of the bars. Whereas in FIG. 7 the bars are interconnected by bridge pieces 63 disposed in a single row on the longitudinal axis of the strip. The two prior strips shown may relatively safely be used in sealing strips entirely made of solid rubber. To the contrary, in a sealing strip of the character disclosed with reference to FIGS. 1 and 3-5, wherein the sealing section of cellular rubber substantially contributes to a reduction in springiness of the sealing strip, reinforcing strips of the type shown in FIGS. 6 and 7 re-introduce a substantial amount springiness, unless the width of the bridging pieces 62, 63 is radically reduced; however, in such a case, the reinforcing strips are easily deformed and broken during extrusion of the polymeric material forming the anchoring section. As compared with thermoplastic resins such as plasticized PVC, rubber is uncomparably more detrimental to the reinforcing strip on extrusion because of its low fluidity. Thus, the width W of the bridging pieces 62, 63 in FIGS. 6 and 7 typically amounts in practice to not less than the width W' of the bars 61. When such strips are used in the sealing strip shown in FIG. 4, for example, and the sealing strip is curved at a radius 3H (H being in FIG. 4 the height of the anchoring section in the plane of curvature), the strip does not passively accept such a curvature and tends to spring back to a curvature having a radius substantially greater, equal to about 5H–6H in the case of the strip of FIG. 6 and to about 8H in the case of the strip of FIG. 7; at the same time well visible wrinkles and undulations appear on the exposed surfaces of the anchoring section 6. Whereas it is an object of this invention to provide, in sealing strips of the character disclosed with reference to FIGS. 1 and 3–5, an improved reinforcing strip of stamped sheet metal by means of which the sealing strip will effectively be constrained to passively accept curvatures of a radius as small as 2H or less without practically no tendency to straighten-out and without wrinkles being formed on the exposed surfaces of the anchoring section. Further objects of this invention are to provide an improved sealing strip satisfactorily solving the problems (a) through (g) pointed out hereinbefore.

Accordingly, this invention provides an extruded flexible sealing strip comprising a longtudinally extending sealing section of cellular polymeric material co-extensive with a longitudinal extending anchoring section of solid (non-cellular) polymeric material extrusion-bonded to said sealing section, and a reinforcing strip stamped of sheet metal embedded longitudinally in the anchoring section, said reinforcing strip consisting, when developed in plane, of a plurality of transverse bars interconnected by bridging pieces formed integrally with the bars and disposed in two transversely spaced longitudinal rows spaced from the ends of the bars (see FIG. 6), said sealing strip being characterized in that the said plurality of bars consists of relatively narrow bars alternating with relatively wide bars in an arrangement comprising relatively narrow gaps alternating with relatively wide gaps between the adjacent bars, and in that each of the bridging pieces extends obliquely between its interconnected bars whereby its root on its adjacent relatively wide bar is closer to the longitudinal axis of the reinforcing strip than its root on its adjacent relatively narrow bar.

According to a particularly preferred embodiment of the invention, the outer edge of each of the bridging pieces is inclined to said longitudinal axis at an angle from 20° to 60° (preferably from 20° to 40°), and the width of each of said pieces at its root on the relatively narrow bar amounts to 0.3–0.7 times the root width on the relatively wide bar.

Referring now to FIG. 2, showing a reinforcing strip 7 of any of the embodiments of the sealing strip shown in FIGS. 1 and 3–5, it will be seen that the strip 7 comprises a plurality of relatively narrow bars 12 of a width A' alternating with relatively wide bars 13 of a width A, all of flat, elongate, rectangular shape, the bars being interconnected by two rows of bridge pieces 14, 15, symmetrically arranged with respect to the longitudinal axis O—O of the strip and spaced from the ends of the bars. The bars and bridge pieces are integrally stamped from sheet metal, such as sheet iron. The bars form therebetween relatively wide gaps 22 (bridged by bridge pieces 15) of a width B alternating with relatively narrow gaps 23 (bridged by bridge pieces 14) of a width B'. It will be also seen in FIG. 2 that the bars are perpendicular to the axis O—O, whereas each of the bridge pieces 14, 15 extends obliquely to said axis in such a manner that the root N of a bridge piece on its associated relatively wide bar 13 is closer to the axis O—O than the root M on its associated relatively narrow bar 12.

Each of the bridge pieces 14, 15 is of a shape tapering towards its associated relatively narrow bar 12 and comprises an outer edge 14', 15', respectively, inclined to the axis O—O at an angle X, Y, respectively, from 20° to 60°, preferably from 20° to 40°; at the same time the width L of the root M is smaller than the width L' of the root N. More particularly, L amounts to 0.3–0.7 times the width L', without, however, exceeding the width A' of the relatively narrow bar 12. It will be thus seen that each of the relatively wide bars 13 with the bridge pieces 14, 15 extending therefrom provides a structure which is relatively rigid per se but which is joined to its adjacent relatively narrow bars 12 through relatively weak roots M.

In this manner, when a sealing strip according to this invention is being adapted to the curvature of its supporting edge or channel, the deformations imposed on the strip concentrate in the root regions M, instead of being incrementally distributed over the lengths of the bridge pieces, with the consequence that the metal in the root regions M involved is deformed beyond the Hooke's law limit and readily takes a permanent set corresponding to the flexure imposed on the sealing strip. The inclination of the bridge pieces 14, 15, as compared with axially directed bridge pieces 62, 63 of FIGS. 6 and 7, adds flexibility to the reinforcing strip (owing to an increased length of the bridge pieces as compared with the distances B, B' of the bars) and, moreover, gives rise to an important advantage which will be more clearly described later on with reference to FIGS. 8 and 9.

Still referring to FIG. 2, the width A of the relatively wide bars 13 amounts to 1.5–1.7 times the width B of their adjacent relatively wide gaps 22, while the width A' of the relatively narrow bars 12 amounts to 1.9–2.1 times the width of their adjacent relatively narrow gaps 23. At the same time the width A' of the relatively narrow bars 12 is substantially equal to the width B of the relatively wide gaps 22, within allowance limits of ±10%. The "weak" roots M of the bridge pieces 14, 15 are all aligned therebetween along two rows parallel to the axis X of the reinforcing strip. The distances D and D' of said rows from their adjacent ends of the bars are not particularly critical; preferably, however, D and D' amount to from ⅙ to ¼ of the width E of the reinforcing strip. The inclination angles X, Y may be identical or different from each other; for example, for a relatively large angle X of, say, 40°, a relatively small angle Y of, say, 20° may advantageously be selected.

With the arrangement just described above, it will be seen in FIG. 2 that the relatively wide and relatively narrow bars 13, 12 form pairs 11 of bars including therebetween a relatively narrow gap 23, said pairs of bars being separated by relatively wide gaps 22. Thus, each of said pairs 11 of bars provides a relatively continuous support for the polymeric material of the anchoring section 6 of the sealing strip during embossing, while the deformability of said pairs per se in use of the sealing strip is permitted by their included bridge pieces 14, and each of said pairs 11 is firmly entrapped by the polymeric material filling at least the relatively wide gaps 22 (if not also the relatively narrow gaps 23). A satisfactory stiffness of the strip 7 during extrusion of the polymeric material is due to the relatively wide bars 13 with the bridge pieces 14, 15 branching therefrom somewhat like stumps of branches of a tree.

For example, a reinforcing strip 7 particularly suitable for an anchoring section 6 of rubber may be proportioned as follows:

E=26 mm.          A=3 mm.
A'=B=2 mm.        B'=1 mm.
X=Y=20°           L=1 mm.
L'=2.5 mm.        D=D'=5 mm.

FIG. 8 shows the strip 7 of FIG. 2 bent to a U-shape about an axis parallel to O—O, for use in an anchoring section 6 of the type shown in FIG. 4 (such section being the one most frequently encountered in practice). FIG. 9 shows the same strip being curved to conform to a supporting edge or flange for the sealing strip of FIG. 4, and it will be seen in this figure that the deformation of the bridge pieces 14, 15 is concentrated in the regions of the roots M on the relatively narrow bars 12, with the ensuing permanent set of the strip 7. However, it will be also readily seen that on passing from the configuration of FIG. 8 to that of FIG. 9 a mutual rotation of the bars 12, 13 is accomplished about the roots M, with the consequence that the back 13A of the U formed by a relatively wide bar 13 tends to displace behind the back 12A of the U formed by a relatively narrow bar 12 thereby avoiding an edge-to-edge contact. This implies (apparently at least) a reduced "pinching" effect of the said backs 12A, 13A on the rubber present between them and permits successful curving of the sealing strip at radiuses as small as 2H (see the description of FIG. 4) and even 1H, with a but irrelevant tendency of the sealing strip to straighten-out and without untolerable wrinkling.

What I claim is:

1. An extruded flexible sealing strip of the character comprising a longitudinally extending sealing section of cellular polymeric material co-extensive with a longitudinally extending anchoring section of solid polymeric material extrusion-bonded to said sealing section, and a reinforcing strip of stamped sheet metal embedded longitudinally in the anchoring section, said reinforcing strip comprising a plurality of transvere bars interconnected by bridging pieces disposed in two transversely spaced longitudinal rows spaced from the ends of the bars and integrally formed with the bars, characterized in that:
   (a) said plurality of bars consist of relatively narrow bars alternating with relatively wide bars, in an arrangement comprising;
   (b) relatively narrow gaps alternating with relatively wide gaps between the adjacent bars;
   (c) each of the bridging pieces extends obliquely between its interconnected bars whereby its root on its adjacent relatively wide bar is closer to the longitudinal axis of the reinforcing strip than its root on its adjacent relatively narrow bar.

2. An extruded flexible sealing strip of the character comprising a longitudinally extending sealing section of cellular polymeric material co-extensive with a longitudinally extending anchoring section of solid polymeric material extrusion-bonded to said sealing section, and a reinforcing strip of stamped sheet metal embedded longitudinally in the anchoring section, said reinforcing strip comprising a plurality of transverse bars interconnected by bridging pieces disposed in two transversely spaced longitudinal rows spaced from the ends of the bars and integrally formed with the bars, characterized in that:
   (a) said plurality of bars consist of relatively narrow bars alternating with relatively wide bars, in an arrangement comprising;
   (b) relatively narrow gaps alternating with relatively wide gaps between the adjacent bars;
   (c) each of the bridging pieces extends obliquely between its interconnected bars whereby its root on its adjacent relatively wide bar is closer to the longitudinal axis of the reinforcing strip than its root on its adjacent relatively narrow bar;
   (d) each of the bridging pieces comprises an outer edge inclined to said longitudinal axis at an angle of from 20° to 60°, and
   (e) the width of each of the bridging pieces at its root on the relatively narrow bar amounts to 0.3–0.7 times the root width on the relatively wide bar.

3. A sealing strip according to claim 2, wherein said angle is from 20° to 40°.

4. An extruded flexible sealing strip of the character comprising a longitudinally extending sealing section of cellular polymeric material co-extensive with a longitudinally extending anchoring section of solid polymeric material extrusion-bonded to said sealing section, and a reinforcing strip of stamped sheet metal embedded longitudinally in the anchoring section, said reinforcing strip comprising a plurality of transverse bars interconnected by bridging pieces disposed in two transversely spaced longitudinal rows spaced from the ends of the bars and integrally formed with the bars, characterized in that:
   (a) said plurality of bars consists of relatively narrow bars alternating with relatively wide bars, in an arrangement comprising;
   (b) relatively narrow gaps alternating with relatively wide gaps between the adjacent bars;

(c) each of the bridging pieces extends obliquely between its interconnected bars whereby its root on its adjacent relatively wide bar is closer to the longitudinal axis of the reinforcing strip than its root on its adjacent relatively narrow bar;

(d) the width of each of the relatively wide bars amounts to 1.5–1.7 times the width of its adjacent realtively wide gap, while the width of each of the relatively narrow bars amounts to 1.9–2.1 times the width of its adjacent relatively narrow gap.

5. A sealing strip according to claim 4, wherein each of the bridging pieces comprises an outer edge inclined to said longitudinal axis at an angle of 20° to 60°, and wherein the width of each of the bridging pieces at its root on the relatively narrow bar amounts to 0.3–0.7 times the root width on the relatively wide bar.

6. A sealing strip according to claim 5, wherein said angle is from 20° to 40°.

7. An extruded flexible sealing strip of the character comprising a longitudinally extending sealing section of cellular polymeric material co-extensive with a longitudinally extending anchoring section of solid polymeric material extrusion-bonded to said sealing section, and a reinforcing strip of stamped sheet metal embedded longitudinally in the anchoring section, said reinforcing strip comprising a plurality of transverse bars interconnected by bridging pieces disposed in two transversely spaced longitudinal rows spaced from the ends of the bars and integrally formed with the bars, characterized in that:

(a) said plurality of bars consists of relatively narrow bars alternating with relatively wide bars, in an arrangement comprising;

(b) relatively narrow gaps alternating with relatively wide gaps between the adjacent bars;

(c) each of the bridging pieces extends obliquely between its interconnected bars whereby its root on its adjacent relatively wide bar is closer to the longitudinal axis of the reinforcing strip than its root on its adjacent relatively narrow bar;

(d) the width of each of the relatively wide bars amounts to 1.5–1.7 times the width of its adjacent relatively wide gap, while the width of each of the relatively narrow bars amounts to 1.9–2.1 times the width of its adjacent relatively narrow gap;

(e) the widths of the relatively narrow bars and the relatively wide gaps are substantially identical within allowance limits of ±10%.

8. An extruded flexible sealing strip of the character comprising a longitudinally extending sealing section of cellular polymeric material co-extensive with a longitudinally extending anchoring section of solid polymeric material extrusion-bonded to said sealing section, and a reinforcing strip of stamped sheet metal embedded longitudinally in the anchoring section, said reinforcing strip comprising a plurality of transverse bars interconnected by bridging pieces disposed in two transversely spaced longitudinal rows spaced from the ends of the bars and integrally formed with the bars, characterized in that:

(a) said plurality of bars consists of relatively narrow bars alternating with relatively wide bars, in an arrangement comprising;

(b) relatively narrow gaps alternating with relatively wide gaps between the adjacent bars;

(c) each of the bridging pieces extends obliquely between its interconnected bars whereby its root on its adjacent relatively wide bar is closer to the longitudinal axis of the reinforcing strip than its root on its adjacent relatively narrow bar;

(d) the width of each of the relatively wide bars amounts to 1.5–1.7 times the width of its adjacent relatively wide gap, while the width of each of the relatively narrow bars amounts to 1.9–2.1 times the width of its adjacent relatively narrow gap;

(e) the widths of the relatively narrow bars and the relatively wide gaps are substantially identical within allowance limits of ±10%;

(f) each of the bridging pieces comprises an outer edge inclined to said longitudinal axis at an angle of 20° to 60°, and (g) the width of each of the bridging pieces at its root on the relatively narrow bar amounts to 0.3–0.7 times the root width on the relatively wide bar.

9. A sealing strip according to claim 8, wherein said angle is from 20° to 40°.

10. A sealing strip according to claim 8, wherein the roots of the bridging pieces on the relatively narrow bars are all aligned in two transversely spaced rectilinear rows spaced from the ends of the bars.

11. An extruded flexible sealing strip of a character comprising a longitudinally extending sealing section of cellular polymeric material coextensive with a longitudinally extending anchoring section of solid polymeric material extrusion-bonded to said sealing section, and a re-enforcing sheet of stamped sheet metal embedded longitudinally in the anchoring section, said re-enforcing strip comprising a plurality of transverse bars interconnected by bridging pieces disposed in two transversely spaced longitudinal rows and integrally formed with the bars, characterized in that said strip comprises a lattice of spaced-apart wide and narrow bars interconnected by obliquely extending bars of non-uniform width.

12. A sealing strip according to claim 11 wherein said obliquely extending bars taper from a greater width at one end to a narrower width at the other end.

13. A sealing strip as set forth in claim 12 wherein the end of each obliquely extending bar having the greater width is disposed adjacent a wide bar.

14. An extruded flexible sealing strip of a character comprising a longitudinally extending sealing section of cellular polymeric material coextensive with a longitudinally extending anchoring section of solid polymeric material extrusion-bonded to said sealing section, and a re-enforcing strip of stamped sheet metal embedded longitudinally in the anchoring section, characterized in that said re-enforcing strip is comprised of a lattice of spaced bars of a plurality of different widths with some of the bars extending parallel to other of said bars and the remainder of said bars extending obliquely.

15. A sealing strip according to claim 14 wherein said obliquely extending bars are of non-uniform width.

References Cited
UNITED STATES PATENTS

| | | | |
|---|---|---|---|
| 1,505,272 | 8/1924 | Mart | 161—111 |
| 2,337,303 | 12/1943 | Spraragen | 161—95 X |
| 3,167,856 | 2/1965 | Zoller | 49—495 X |
| 3,394,044 | 7/1968 | Bright | 161—117 |

WILLIAM A. POWELL, Primary Examiner

U.S. Cl. X.R.

49—495; 161—100, 113, 117, 122, 139, 149